United States Patent

Gallina

[15] 3,691,544

[45] Sept. 12, 1972

[54] CONTROL CIRCUIT RESPONSIVE TO SYNCH SIGNALS

[72] Inventor: Harold Gallina, 40 Parkview Ave., Belleville, N.J. 07109

[22] Filed: June 22, 1971

[21] Appl. No.: 155,430

[52] U.S. Cl. ........................340/174.1 B, 179/100.2 S

[51] Int. Cl. ..............................................G11b 15/02

[58] Field of Search .............179/100.2 S, 100.2 MD; 340/174.1 B, 174.1 G, 174.1 H

[56] References Cited

UNITED STATES PATENTS

| | | | |
|---|---|---|---|
| 3,564,161 | 2/1971 | Takishima | 179/100.2 S |
| 3,154,762 | 10/1964 | Morpher, Jr. | 340/174.1 B |
| 3,286,243 | 11/1966 | Floros | 340/174.1 B |
| 3,500,362 | 3/1970 | Schmitz | 340/174.1 B |
| 3,456,237 | 7/1969 | Collins | 340/174.1 B |

*Primary Examiner*—Vincent P. Canney
*Attorney*—Sang Ki Lee

[57] ABSTRACT

An electronic programmer includes means for writing and reading a control signal from a recording medium, and means for switching the programmer from the writing to the reading mode of operations and vice versa. For the readout mode of operation the programmer is provided with means for detecting bursts of a.c. signals from the recording medium and means responsive to the a.c. signals for generating a pulse train having a number of pulses corresponding to the number of the a.c. signal bursts, a control circuit responsive to the detected a.c. signals for generating a reset signal and a register signal, a shift register responsive to the reset signal for counting the number of pulses from the pulse generating means and generating an output signal, and a register responsive to the register signal for applying the output signal to a load. To change to the writing mode of operation, the programmer is provided with switching means for turning off the detecting means and means for setting the pulse generator to generate only a predetermined number of pulses, means for encoding the pulses into a series of bursts of a.c. signals and writing the bursts of the encoded a.c. signals on the recording medium. The programmer may be also provided with means for erasing any prerecorded signal on the recording medium while the control signal is being recorded.

10 Claims, 4 Drawing Figures

INVENTOR.
HAROLD GALLINA

BY [signature]

ATTORNEY

INVENTOR.
HAROLD GALLINA

BY [signature]

ATTORNEY

CONTROL CIRCUIT RESPONSIVE TO SYNCH SIGNALS

BACKGROUND OF THE INVENTION

1. Field of the Invention

The present invention relates to circuit means for writing and reading control signals of predetermined characteristics on a recording medium, and, more particularly, to a novel, simplified, and improved programmer including switching means and a control circuit for setting the programmer to operate in the writing or reading mode of operation.

2. Description of the Prior Art

Certain audio-visual equipments, such as those used to project film strips having a plurality of still pictures connected in series are often provided with a magnetic tape carrying voice descriptions of successive frames of the pictures. Various attempts have been made to provide means for synchronizing the voice descriptions to the frames of pictures as they are being advanced. One approach has been to utilize a binary signal encoded in the magnetic tape at the end of the description of each picture. The binary signal is then read out, during the playback, to actuate a mechanism which advances the picture frames in synchronization with the description. Another approach has been to utilize multi-frequency signals in a similar manner. Still another approach has been to punch coded apertures in a tape accompanying the film strip and decode the apertures in a usual manner using a mechanical arrangement.

These approaches have been subject to certain shortcomings and disadvantages. Thus, for example, the binary signalling system has been found to require rather complex and unwieldy circuit means for encoding and decoding the control signal. The multi-frequency signalling system has been found suseptible to the external sound or noises, and in addition, susceptible to the change in the speed of the tape in that as it starts or stops it causes changes in the component frequencies of the multifrequency signal, and that the changes in the frequencies have tended to make signalling unreliable. The punched tape approach has its inherent shortcomings in that it requires a number of moving parts which are subject to the usual wear and tear. Moreover, the moving parts tend to generate noises which are recorded on the magnetic tape and inject undesirable noise into the control signal. Moreover, these devices have been found to require considerable amount of maintenance work and a considerable degree of care to operate them, and generally have been found to have a short life expectancy.

SUMMARY OF THE INVENTION

It is therefore an object of the present invention to provide an electronic programmer which overcomes the aforementioned shortcomings of the prior art devices.

It is another object of the present invention to provide circuit means which enable the electronic programmer to record or read out control signals from an advancing magnetic tape.

It is still another object of the present invention to provide an electronic programmer which includes means for utilizing substantially all of the same circuit elements for both the reading and the writing operation.

It is a further object of the present invention to provide circuit means which control the signal characteristics of the control signal being recorded on the magnetic tape in a precise manner.

It is still a further object of the present invention to provide reliable circuit means which can encode and decode bursts of a.c. signals of a particular frequency on an advancing magnetic tape automatically independent of variations in the manner a person operates the programmer.

These and other objects of the present invention are achieved by providing a programmer having means for detecting signals from the recording medium, means responsive to the detected signal for generating a train of pulses of a predetermined number related to the detected signal, a shift register connected to the pulse generating means, a control circuit responsive to the detected signal for generating reset signal to clear the shift register to count the pulses in the detected signal and generate an output signal, and a register signal, and means responsive to the register signal for applying the output signal to an output utilization means. The programmer is further provided switching means for deenergizing the detecting means, means for presetting the pulse generating means to generate only a predetermined number of pulses and means for encoding the pulses so generated and writing the encoded signal to the recording medium.

It is a feature of the present invention to provide a control circuit adapted to generate the reset and register signals in response to the detected signal.

It is a further feature of the present invention to provide a bleeding circuit, interposed between the shift register and pulse generating means and means for actuating the bleeding circuit during the writing mode of operation of the programmer, for limiting the pulse generating means to generate a preset number of pulses.

It is still another feature of the present invention to provide a Schmitt trigger for reshaping the output of the pulse generating means into square waves, and an a.c. generator responsive to the output of the Schmitt trigger for generating a.c. signal bursts of a predetermined frequency, and means for recording the a.c. signal bursts on an advancing magnetic tape.

It is still a further feature of the present invention to provide means for erasing any prerecorded signal from the magnetic tape while the a.c. signal bursts are being recorded.

The aforementioned and other objects and features of the present invention will be more apparent from the following detailed description and the accompanying drawings.

DETAILED DESCRIPTION OF THE PREFERRED EMBODIMENT OF THE INVENTION

Figure 1:
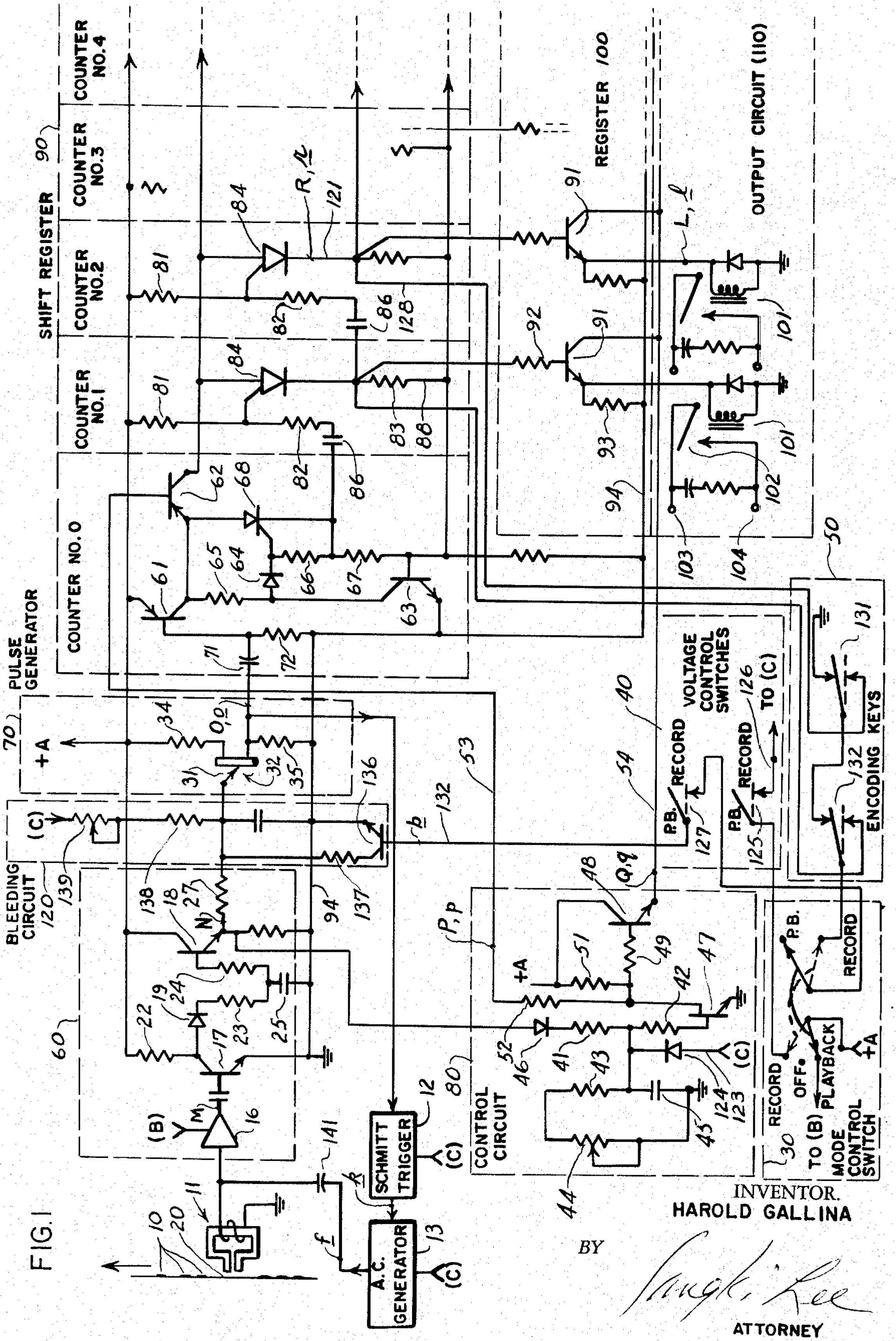
FIG. 1 is a schematic circuit diagram of the programmer according to a preferred embodiment of the present invention.

Generally, as shown in FIG. 1, the programmer of the present invention is designed to read out the control signals 10 written on a magnetic tape 20, by turning a knob (not shown) of the mode control switch 30 to a playback position and write the control signal 10 into the magnetic tape 20 by turning the knob to the record position and closing a voltage control switch 40 and pressing a selected one of the encoding keys 50.

With the knob in the mode control switches 30 turned to the play back position, the control signal 10 of a predetermined number of bursts of a.c. signals of a particular frequency is picked up by the magnetic pick-up unit 11. The a.c. signal picked up by the pick-up unit 11 is in turn detected by a detecting unit 60 which in turn applies the detected signal to a pulse generator 70 and a control circuit 80. The control circuit 80 is designed to generate a first output which is applied to a shift register 90 to re-set and prepare it to receive the pulses from the pulse generator 70. The control circuit 80 also generates a second output which is applied to a register 100. The counters in the shift register 90 counts the pulses from the pulse generator 70 in the usual manner and generate a count signal. The register 100 is adapted to respond to the second and the count signals and generate an output signal which is in turn applied through a register 100 to an output load circuit 110.

With the knob turned to the record position shown by the dotted line, and pressing the contacts of the voltage control switch to the closed positions, and then pressing one of the encoding keys 50, the detecting means 60 is de-energized and a series circuit of a Schmitt trigger 12 and an a.c. generator 13 interposed between the output of the pulse generator 70, a bleeding circuit 120 and the control circuit 80 are energized. In response, the pulse generator 70 commences to generate a train of pulses. In the meantime, the control circuit also generates the re-set and register signals for preparing the shift register 90 and the register circuit 100. When a predetermined number of pulses are counted as determined by the closed contacts of the encoding keys 50, the bleeding circuit 120 is actuated to bleed out an enabling current applied to the pulse generator 70 and disable it. The predetermined number of pulses generatoed by the pulse generator 70 are applied to the Schmitt trigger 12, the latter reshaped and then applies them to the a.c. generator 13 which in turn is adapted to generate the bursts of 1,000 Hz signal. The bursts of the a.c. signal so generated are then recorded on the magnetic tape 20 through the magnetic head 11 in a usual manner.

The programmer according to the preferred embodiment shown in FIG. 1 may be further provided with an erasing circuit 150 erases any extraneous signals on the magnetic tape when the programmer is set to operate in its writing mode of operation. The aforedescribed embodiment of the programmer in accordance with the present invention will now be described in more detail as follows.

The detecting means 60 may include an amplifier 16 of a conventional design which is energized by a battery source B when the control knob is turned to the PLAY BACK position and which detects the bursts of the 1,000 Hz and amplify them. The detecting means 60 forther includes rectifying means including transistors 17 and 18, a diode 19, resistive elements 22, 23, and 24, a capacitor 25 connected in a manner as shown for rectifying and further amplifying the output of the amplifier 16. The output of the rectifying means is applied to the pulse generator 70 and to the control circuit 80. The pulse generator 70 may include a unijunction transistor 32 and biasing resistors 34 and 35 connected in the manner shown to a d.c. voltage source A so that it is energized during the reading and writing cycles of operation. There is provided an RC network made of a resistor 27 and a capacitor 28 between the output of the detecting means 60 and the trigger electrode 31 of the unijunction transistor 32 in the manner shown for triggering the latter into conduction. The RC network introduces a time delay to the output of the pulse generator 70 in that the unijunction transistor 32 will turn on only when the capacitor 28 is charged high enough by the output of the detecting means so that the trigger electrode 31 turns the transistor 32 on.

The control circuit 80 includes an RC network made of resistors 41, 42, and 43 and a potentiometer 44 and a capacitor 45 and transistors 47, 48 and biasing resistors 49, 51 and 52 connected in the manner shown. The potentiometer 44 is provided to adjust the reaction speed of the control circuit in that it controls the time required for the output from the detector 60 to charge the capacitor 45 high enough to turn the transistor 47 on. The output of the detector 60 may be applied to the control circuit 80 through a diode 46 to the resistor 41 of the passive network to provide an a.c. isolation between the control circuit 80 and the detecting means 60. Various parameters of the RC network are so adjusted that they integrate the rectified a.c. signal from the detecting means 60 and develop and hold a d.c. voltage sufficient enough to turn the transistors 47 and 48 on and off while the a.c. signal bursts are being received.

The control circuit includes two output paths 53 and 54. The first path 53 connects the collector resistor 52 of the first transistor 47 to the shift register 90 as shown. In this manner the d.c. potential +A normally applied to the path 53 to turn off the shift register 90 is made to decrease to near zero voltage when the transistor 47 is made to conduct by the detected signal. The second path 54 connects the emitter electrode of the second transistor 48 to the register 100 for enabling the latter to apply the output from the shift register 90 to an output load circuit as will be explained in detail hereinafter.

The shift register 90 may include any predetermined number of counters No. 0, 1, 2, 3, etc. connected in a conventional manner. The initial or counter No. 0 includes transistor 61, 62, 63, diode 64, resistors 65, 66, and 67 and a semiconductor switch element 68 connected in a conventional manner as shown. The counter No. 0 is coupled to the output of the pulse generator 70 through a capacitor 71 and a resistor 72 as shown. The successive counters are each made of resistors 81, 82, 83 connected in the manner shown to provide a suitable operating bias potential to the switching element 84. The trigger electrode of the switching element 84 is coupled to the cathode electrode of the switching element 84 of the preceding counter through the resistor 82 and a capacitor 86 as shown. The output at the cathode electrode of the element 84 is in turn connected to the register 100 through a conductive path 88. The register 100 includes a plurality of transistor stages, each coupled to a corresponding counter of the shift register 90. Each stage includes a transistor 91 whose base electrode is connected to the path 88 of a counter through a resistor 92. The collector electrode thereof is connected to the control circuit 80 through the second output path 54. A resistor 93 is interposed between the emitter electrode of the transistor 91 and the ground lead 94 of the programmer. The emitter electrode of the transistor 91 is also connected to a suitable output load circuit 110 as shown.

The output circuit 110 may include a plurality of relays 101, each connected to a corresponding counter through a register circuit, and adapted to a close contact 102 for providing a continuity across the output terminals 103 and 104 and thereby operate any suitable output drive means (not shown).

For the writing mode of operation, the mode control switch 30 is provided with RECORD position and the voltage control switch is provided with normally open contacts 125 and 127 and the encoding keys 50 is provided with a plurality of keys 131, 132, etc. By turning the control knob to the RECORD position, and closing the contact 125, a d.c. potential +A is applied to the lead B is cut off and is applied to the Schmitt trigger 12, the A.C. generator 13 the control circuit 80, and the bleeding circuit 120 through the conductor path C connected to the stationary contact 126 of the voltage control switch 40. The bleeding circuit 120 includes a transistor 136, resistors 137 and 138, and a potentiometer 139 connected in the manner shown. The bleeding circuit is so designed that the transistor 136 will conduct when a d.c. voltage output from any particular one base of the counters of the shift register 90 is applied to its base electrode 132. When the transistor 136 conducts, the resistor 137 and the transistor 136 provides a shunting path to the capacitor 28 to discharge it and thereby bleed off the current from the d.c. source applied through the potentiometer 139 and the resistor 138 to charge the capacitor 28, and enable the trigger electrode 31 to turn the unijunction transistor 32 off. When off, the pulse generator 70 stops generating the pulses. As will be evident from the following, the number of pulses so generated will be determined by the particular key associated with a particular counter.

Figure 2:
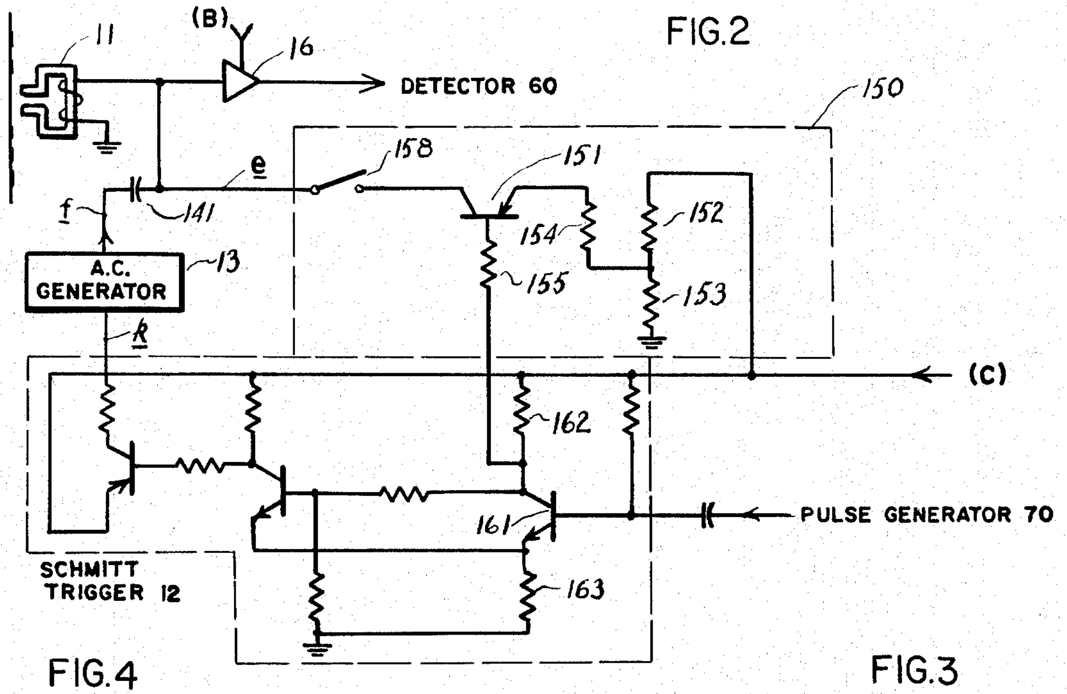
FIG. 2 shows an erasing means that may be provided in the programmer shown in FIG. 1 for erasing prerecorded signal from the recording medium while the control signal is being recorded.

The output pulses from the pulse generator is then applied to the Schmitt trigger 12 for reshaping and the reshaped pulses turn the A.C. generator 13 on and thereby generate A.C. signals which are in turn recorded in the magnetic tape. As shown in FIG. 2, the programmer may further include an erasing circuit 150 comprised of a transistor 151 and biasing resistors 152-155 connected in the manner shown. The resistor 155 applies the output of the first transistor stage of the Schmitt trigger 12 and the path C is connected to the resistor 152 to supply the d.c. voltage to the erasing circuit 150 during the writing mode of operation. The erasing circuit 150 may include a contact switch 158 which may be closed to put the erasing circuit 150 into operation only when the control signal is being recorded. The erasing circuit is designed to erase any extraneous signals that may be in the magnetic tape when the control signal is being recorded on the tape.

Figure 4:
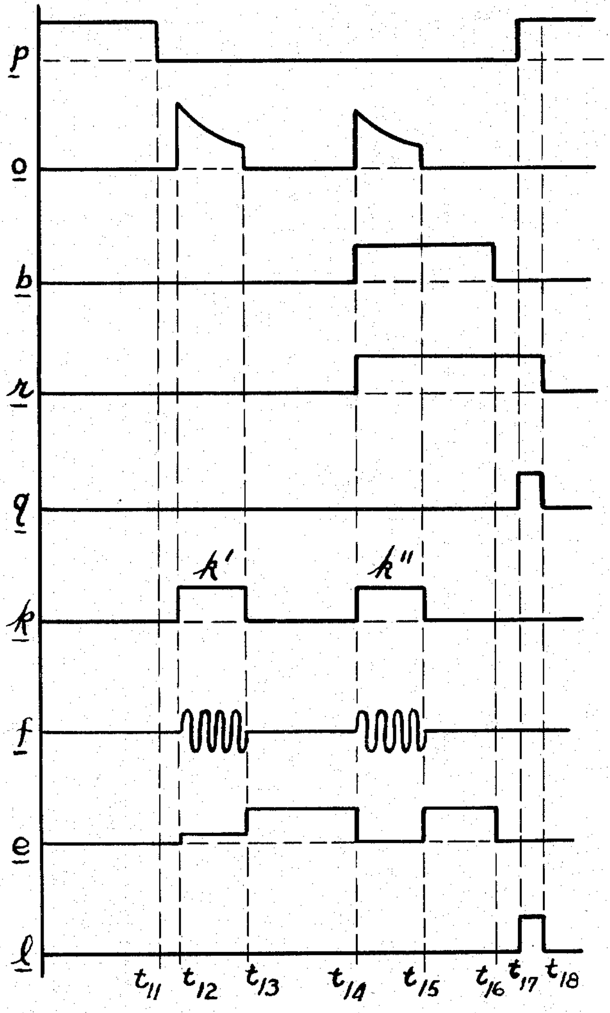
FIG. 4 shows wave forms of the programmer at various locations during the writing mode of its operation.
Figure 3:
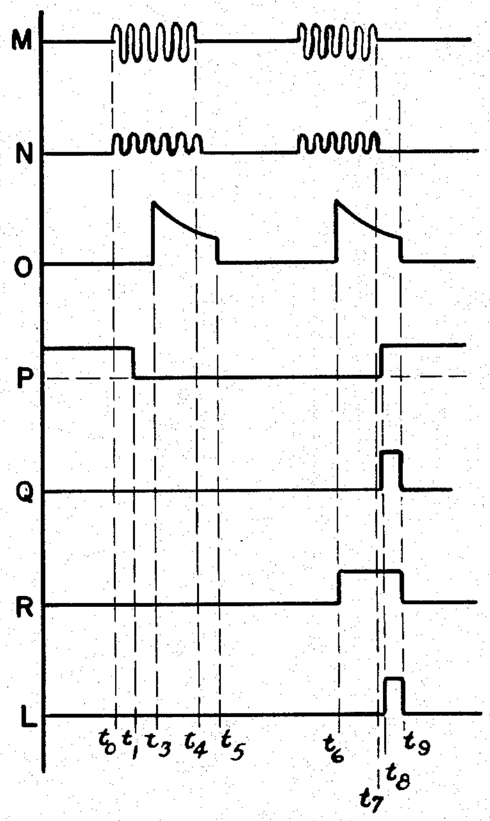
FIG. 3 shows wave forms at various locations of the programmer during the reading mode of its operation.

The operation of the present programmer shown in FIGS. 1 and 2 clearly may be more understood from the following description of the reading and writing cycles in conjunction with FIGS. 3 and 4 respectively.

READING CYCLE

With the control knob in the mode control switch 30 turned to the PLAYBACK (P.B.) position, a d.c. potential +A is applied to the detecting means 60, pulse generator 70 and shift register 90 to prepare them for operation. As the magnetic tape 20 is driven forward, the pickup unit 11 and the detecting means 60 reads out the bursts of the a.c. signal from the tape 20 in the usual manner. The a.c. signals so detected are a series of bursts of the a.c. signals as shown in the wave form M in FIG. 3. After it is detected and amplified by the amplifier 16, the amplified a.c. signal is then rectified and further amplified by the circuit elements 17–25. The output at the emitter electrode of the transistor 18 of the detecting means 60 appears in the form of a half wave rectification as shown in the wave form N in FIG. 3. The output N is then applied to the control circuit 80 and the pulse generator 70.

The output from the detecting means charges the capacitor 45 in the control circuit 80 and causes the voltage at the junction between the resistor 43 and the capacitor 45 to reach a level that will turn the transistor 47 on. This is shown in the wave form P in FIG. 3 which shows the voltage wave at the output path 53 connected to the collector electrode of the transistor 47 through the resistor 52. There is a time delay of a predetermined amount as adjusted by the potentiometer 44 between the beginning of the detected and the rectified a.c. signal at $t_0$ and the time $t$ $l$ when the transistor 47 is switched into the conducting state at $t_1$ as shown in FIG. 3. The voltage at the collector electrode of the transistor 47 and the output path 53 is at the bias supply voltage +A till the transistor 47 conducts at time $t_1$. The bias potential applied to the base electrode 62 of the shift register 90 blocks the latter from turning on. As soon as the transistor 47 is turned on its collector potential approaches zero voltage and this potential is applied to the base electrode of the transistor 62 and thereby prepare it to turn on when the emitter electrode thereof is subjected to the incoming pulse from the pulse generator 70. The parameters of the RC network 41–46 are so adjusted that they continue to store a charge in the capacitor 45 to hold a potential to the base electrode of the transistor 47 at a level to keep it turned on during the entire duration while the series of bursts of the a.c. signals are being received.

In the meantime, the register signal path 54 remains in open state since the ground return path via the transistor 90 is blocked off by the transistor 91 which is in its nonconductive state.

The output from the detecting means 60 is applied to the trigger electrode 31 of the unijunction transistor 32 through the RC circuit made of the resistor 27 and the capacitor 28. The unijunction transistor is turned on when the potential across the capacitor 28 reaches a threshold voltage at $t_3$ as shown in FIG. 3. The resistor 27 and the capacitor 28 are so adjusted that the time delay between the initial phase of the detected a.c. signal at $t_0$ and the time when the unijunction transistor 32 is turned on at $t_3$ is somewhat longer than the time required for the output of the detecting circuit 80 at time $t_2$ by its RC network 41–45. The output of the unijunction transistor 32 appears in the form of the wave form O as shown in FIG. 3, and this is applied to the shift register 90 through the coupling capacitor 71. As shown in the wave form O in FIG. 3, because of the time delay caused by the discharge through the capacitor 28, there is a time delay between the time $t_4$ when the output wave of the detecting means dies out and the time $t_5$ when the output of the unijunction transistor dies out.

The shift register 90 operates in the conventional manner in that the counter No. 0 is prepared to receive the pulse from the pulse generator as soon as the control knob of the mode control switch is turned to the playback mode. More specifically, when the bias is applied to the shift register 90, the transistors 61 and 63 become conductive and the transistor 62 is prepared to receive the pulses from the pulse generator. For example, the two pulses from the pulse generator 70 applied to the shift register as shown in FIG. 3 turn on the counter No. 1 and then the counter No. 2. As soon as the counter No. 2 is turned on in response to the second pulse from the pulse generator at the time $t_6$, the output of the switching element 84 of the counter No. 2 at the cathode electrode 121 reaches a certain positive potential as shown in wave form R.

While the two pulses are being counted the potential level at the register signal path 54 at the emitter electrode of the transistor 48 in the control circuit remains at zero level because the transistor 47 continues to conduct while the two detected and rectified a.c. signals last. The transistor 91 is kept in the open and non-conductive state as shown in the wave form Q till the transistor 47 is turned off at the time $t_8$ sometime after the second detected rectified wave dies out at time $t_7$. This changes the output potential level at the collector electrode of the transistor 47 back to a potential level which approaches that of the bias potential +A at $t_8$. The trailing edge of the output of the pulse generator 70 will be cut off at time $t_9$ sometime after the detected and rectified a.c. signal dies out at time $t_7$. There is therefore a time interval between the time $t_8$ and $t_9$ during which the second counter remains conductive after the transistor 47 is turned off and the second pulse from the pulse generator dies out. During this time interval the transistor 91 is made conductive and this enables the transistor 48 of the control circuit conductive, with the aid of the potential R at the output or cathode electrode 121 of the second counter until the second pulse dies out at time $t_9$. The wave form Q shows what is happening at the register signal path 54. The register signal Q and the voltage output R of the counter No. 2 cause the transistor 91 to turn on and apply the output at the cathode electrode 121 of the counter to the load output circuit 110 for the duration between the time $t_8$ and $t_9$ shown in the wave form L in FIG. 2. The output wave L may be applied to any suitable output utilization means, such as a relay circuit 101 having a normally open contact as schematically shown in the output circuit 110. Once the second pulse dies out at $t_9$ the reset pulse in the form of the bias potential +A applied to the base electrode of the transistor 62 resets the counters of the shift register 90 in a conventional manner, and this causes the output wave forms Q, R and L at the register signal path 54, cathode electrode 121 of the counter and the output of the register 100 to die out and prepare the circuit for a subsequent use.

WRITING CYCLE

By turning the knob in the control switch 30 and closing the contacts 125 and 127 of the voltage control switch 40 to the RECORD position, the potential applied to the amplifier 16 of the detecting circuit 60 is turned off and instead applied to the Schmitt trigger 12, the a.c. generator 13, and the bleeding circuit 120. The control circuit is also energized by the d.c. potential through a diode 124 as shown in FIG. 1. Once the capacitor 45 charges the voltage applied to the base electrode 47 to a certain level the transistor 47 begins to conduct and as this happens at $t_{11}$ the bias potential applied to the base electrode of the transistor 62 through the reset output path 53 is turned off and prepares the shift register 90 to receive the pulses from the pulse generator 70. This is shown in the wave form *p* in FIG. 4. As stated above, the transistors 61 and 63 become conductive as the bias potential +A is still applied to the shift register 90.

Any one of the number of encoding keys 40 corresponding to a particular counter number, for example, key 131 which corresponds to the counter No. 2 may be pressed for applying the output of the counter to the bleeding circuit 120. The unijunction transistor 32 begins to generate the pulses at time $t_{12}$ when the voltage at the capacitor 28 is charged high enough by the d.c. voltage as shown in the wave form o in FIG. 4. With the key 131 of the encoding keys 50 and the contact element 127 closed, the register will count two pulses and its output will actuate the bleeding circuit 120 to disable the pulse generator 70 to limit the pulses generated by the latter to two. With the contacts 127 and 131 closed, the base electrode of the transistor 136 of the bleeding circuit 120 which was at the ground potential before the key 131 was closed, is now prepared to apply the output voltage *r* appearing at the output or the cathode electrode 121 of the solid state switching element 84 of the counter No. 2 through the path 128. The conductor path 128 applies the output of the counter No. 2 at $t_{14}$ when the counter No. 2 receives the second pulse from the pulse generator 70. This turns on the transistor 136 and thereby provides a discharge bypath from the d.c. current from the voltage source through the potentiometer 139 and resistor 138 and shunt out the capacitor 28. This turns off the unijunction transistor 32 inasmuch as the trigger electrode 31 thereof is effectively shunted to the ground through the resistor 137 and the transistor 136. The output at the cathode electrode 121 of the counter No. 2 remains at a positive potential level as shown in the wave form *r* in FIG. 4 while the key 131 of the encoding keys 50 is kept in the closed position. This keeps the transistor 136 of the bleeding circuit in the conducting state and continues to block the unijunction transistor so that it can not generate any more pulses after the second one. Some time $t_{16}$ later when the key 131, and voltage control switch contacts 125 and 127 are released and thus open the path 128, the base electrode 132 of the transistor 136 is reduced to the ground. The transistor 47 of the control circuit does not turn off immediately at time $t_{16}$ but some time later at $t_{17}$ delayed by the stored charge at the capacitor 45. The counter No. 2 continues to provide an output $r$ at the cathode electrode 121 of the counter No. 2 until sometime after the transistor 47 is turned off at $t_{17}$ a bit of time after the transistor 48 is turned on and off as shown by the wave form $q$. When the transistor 48 is turned off and in turn the transistor 91 is turned off, the counter No. 2 and the associated register circuit 91 provides an output pulse 1 which coincides with the register pulse $r$. The output pulse 1 may be used to actuate an output load circuit 101.

The output pulses 0 generated by the pulse generator 70 is applied to the Schmitt trigger 12 of a conventional type shown in detail in FIG. 3. The trigger reshapes the pulses into rectangular forms as shown in the wave form $k$ and applies the reshaped pulses to the a.c. generator. The generator may be of a conventional type which generates 1,000 Hz for the time duration of each of the pulses $t_{12}$ to $t_{13}$ and $t_{14}$ to $t_{15}$ as shown in the wave form $f$. In accordance with a feature of the present invention, the erasing circuit 150 is provided as shown in FIG. 2. With the programmer put into the writing mode of operation, and the contact 158 closed, the erasing circuit is energized until time $t_{12}$ that is, until the arrival time of the first pulse the transistor 151 does not conduct because the first transistor 161 of the trigger 12 is non-conductive and enables the d.c. source from the source C to reverse bias the base electrode of the transistor 151 through the resistors 162 and 155. At time $t_{12}$ when the transistor 161 conducts, the base electrode of the transistor 151 is grounded through the resistor 155, the transistor 161 and resistor 163, the output potential of the eraser 150 increases to a first level shown in the wave form *3*. The amplitude of the output voltage $e$ is however negligible at this time in that the conducting transistor 161 effectively functions as shunting path to the ground. The output voltage $e$ increases to a significantly high enough amplitude, when the transistor 161 is turned off at $t_{13}$ when the first pulse $k$ dies out. This happens as the current shunted out by the transistor 161 is now made to flow through the collector electrode of the transistor 151. In this manner, a d.c. voltage is applied to the magnetic tape to erase any extraneous pulse that may be previously recorded in the tape until the arrival of the second pulse at time $t_{14}$. At this point in time the output of the erase circuit 150 returns to the low voltage of the negligible magnitude and returns to the high d.c. voltage at time $t_{15}$ when the transistor 161 is turned off again as the second pulse $k''$ dies out. The d.c. continues to be applied to magnetic tape to erase any unwanted signal until the voltage control switch 40 is opened at time $t_{17}$ to remove the d.c. voltage applied to the trigger 12 through the path C.

Various modifications and changes may be made to the present programmer from the principles of the invention described above without departing from the spirit and scope thereof.

What is claimed is:

1. A programmer for reading a control signal from a recording medium and applying it to an output circuit comprising:
means for detecting the control signal from the recording medium;
means responsive to said detected control signals for generating a series of pulses of a predetermined number related to the control signal;
a shift register;
a control circuit responsive to said detected signal for generating a re-set signal and a register signal;
means for applying said re-set signal to said shift register for enabling said shift register to receive said series of pulses and generate an output signal;
means responsive to said register signal for applying said output signal to said output circuit.

2. The programmer according to claim 1 including:
means for switching said programmer to a writing mode of operation and vice versa,
means for de-energizing said detecting means, energizing said pulse generating means to generate pulses, and energizing said control circuit to generate said re-set and register signals when said switching means sets said programmer in the reading mode of operation;
means for presetting said shift register to count a predetermined number of pulses from said pulse generating means;
said shift register responsive to said re-set signal and generating an output signal upon receiving said predetermined number of pulses;
means responsive to said output signal for bleeding said pulse generating means and thereby limiting the number of pulses being generated by said pulse generating means to said predetermined member; and
means for encoding said predetermined number of pulses into the control signals and writing said control signal on said recording medium.

3. The programmer according to claim 2 wherein:
said register signal responsive means is adapted to apply said output signal to said output circuit during the writing mode of operation.

4. The programmer according to claim 1, including detecting means and said pulse generating means for introducing a time delay to the output pulses of said pulse generating means;
said control circuit having active circuit means for providing said re-set and register signals respectively, and
a passive network interposed between said detecting means and said active means for introducing time delays to said re-set and register signals so that said re-set signal is applied to said shift register while said control signal is being detected by said detecting means and that said register signal is generated after said re-set signal is extinguished but before the last of said pulses generated by said pulse generating means extinguishes.

5. The programmer according to claim 4 wherein transistors connected in series, said first transistor providing said re-set signal, said second transistor providing said register signal; and
said passive network including a capacitor for storing the signal from said detecting means, and a potentiometer for controlling the time duration of the storage, whereby said active network is held operative while said control signal is being detected by said detecting means.

6. The programmer according to claim 5, wherein:
said shift register includes a plurality of counters;
said register includes a plurality of registering circuits each being interposed between a corresponding one of said counters and the output of said second transistor of said control circuit; and
means for energizing the registering circuit corresponding to a particular one of said counters for applying the output thereof to the output circuit.

7. The programmer according to claim 2 wherein said bleeding means includes an active element interposed between said pulse generating means, said active element becoming operative during the writing mode of operation in response to said output signal after said predetermined number of pulses are generated.

8. The programmer according to claim 7, wherein:
said bleeding circuit includes a potentiometer and a capacitor for controlling the response speed of said pulse generating means.

9. The programmer according to claim 2, wherein said encoding means includes:
a Schmitt trigger responsive to the output of said pulse generating means for reshaping the output thereof into rectangular pulse waves,
an a.c. generator responsive to said rectangular waves for generating bursts of a.c. waves of a particular frequency, number of bursts corresponding to the number of said pulses.

10. The programmer according to claim 9, including an erasing means having an active element responsive to the actuation of said Schmitt trigger and generating a d.c. voltage at the end of each pulse as detected by said trigger, and
means for applying said d.c. voltage on said recording medium during the writing cycle of operation between successive ones of said pulses in erasing the extraneous signal on said recording medium.

* * * * *